United States Patent
Park et al.

(10) Patent No.: US 10,814,821 B2
(45) Date of Patent: Oct. 27, 2020

(54) AIRBAG APPARATUS

(71) Applicant: Hyundai Mobis Co., Ltd., Seoul (KR)

(72) Inventors: Hae Kwon Park, Yongin-si (KR); Ga Ram Jeong, Yongin-si (KR); Rae Ick Jang, Seongnam-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 126 days.

(21) Appl. No.: 15/921,770

(22) Filed: Mar. 15, 2018

(65) Prior Publication Data

US 2018/0265030 A1 Sep. 20, 2018

(30) Foreign Application Priority Data

Mar. 16, 2017 (KR) .................. 10-2017-0033409

(51) Int. Cl.
*B60R 21/233* (2006.01)
*B60R 21/00* (2006.01)
*B60R 21/2338* (2011.01)

(52) U.S. Cl.
CPC .... *B60R 21/233* (2013.01); *B60R 2021/0004* (2013.01); *B60R 2021/0009* (2013.01); *B60R 2021/0048* (2013.01); *B60R 2021/23308* (2013.01); *B60R 2021/23316* (2013.01); *B60R 2021/23324* (2013.01); *B60R 2021/23386* (2013.01)

(58) Field of Classification Search
CPC ........ B60R 21/233; B60R 2021/23308; B60R 21/231; B60R 2021/23386
See application file for complete search history.

(56) References Cited

U.S. PATENT DOCUMENTS

| | | | |
|---|---|---|---|
| 6,517,109 B1 * | 2/2003 | Van Poppel | B60R 21/231 280/743.1 |
| 7,073,818 B2 * | 7/2006 | Hasebe | B60R 21/233 280/729 |
| 9,446,735 B1 * | 9/2016 | Jayasuriya | B60R 21/232 |
| 9,688,232 B1 * | 6/2017 | Loew | B60R 21/207 |
| 10,183,645 B2 * | 1/2019 | Rose | B60R 21/01552 |
| 10,343,641 B2 * | 7/2019 | Abramoski | B60R 21/233 |
| 2017/0057453 A1 * | 3/2017 | Morris | B60R 21/233 |
| 2019/0009745 A1 * | 1/2019 | Hikida | B60R 21/233 |

* cited by examiner

*Primary Examiner* — Nicole T Verley
(74) *Attorney, Agent, or Firm* — H.C. Park & Associates

(57) ABSTRACT

An airbag apparatus including: a first chamber connected to an inflator; a second chamber supported by the first chamber, and connected to the rear of the first chamber so as to support the head of a passenger in case of an oblique collision of a vehicle; a third chamber supported by the first chamber, connected to the rear of the first chamber, and disposed at one side of the second chamber so as to support the head of the passenger in case of a head-on collision of the vehicle; and a connection tether connecting the second and third chambers such that the second and third chambers are suppressed from separating from each other.

11 Claims, 10 Drawing Sheets

AIRBAG APPARATUS

CROSS-REFERENCES TO RELATED APPLICATION

This application claims priority from and the benefit of Korean Application No. 10-2017-0033409, filed on Mar. 16, 2017, which is hereby incorporated by reference for all purposes as if set forth herein.

BACKGROUND

Field

Exemplary embodiments relate to an airbag apparatus, and more particularly, to an airbag apparatus capable of protecting the head of a passenger in case of an oblique collision or head-on collision of a vehicle.

Discussion of the Background

In general, a vehicle includes an airbag installed to protect a passenger. The airbag may be installed at various positions depending on the body parts of a passenger, which need to be protected. A driver airbag is installed in a steering wheel in order to protect the head of a driver, and a passenger airbag is installed at the front of a vehicle in order to protect the head of a passenger sitting by the driver.

In case of a head-on or oblique collision of a vehicle, an electronic control module decides whether to explode a detonator of an inflator. When gas is generated from the inflator, an airbag cushion is expanded by the generated gas.

As the regulations for passenger protection are tightened, the sizes of airbag cushions are increased. Furthermore, in order to rapidly deploy a large-sized airbag cushion, two inflators are connected to the airbag cushion.

However, when the size of the airbag cushion is increased, a time required for the airbag cushion to expand is also increased. Therefore, in case of an oblique collision of the vehicle, a time required for the airbag cushion to hold the head is delayed. When the time required for the airbag cushion to hold the head is delayed, the head or neck of the passenger may be injured while the head is turned.

Furthermore, when the size of the airbag cushion and the installation number of inflators are increased, the manufacturing cost of the vehicle inevitably rises.

Therefore, there is a demand for a structure capable of solving the problems.

The above information disclosed in this Background section is only for enhancement of understanding of the background of the invention and, therefore, it may contain information that does not constitute prior art.

SUMMARY

Exemplary embodiments of the present invention provide an airbag apparatus capable of protecting the head of a passenger in case of an oblique collision or head-on collision of a vehicle.

An exemplary embodiment provides an airbag apparatus including: a first chamber connected to an inflator; a second chamber supported by the first chamber, and connected to the rear of the first chamber so as to support the head of a passenger in case of an oblique collision of a vehicle; a third chamber supported by the first chamber, connected to the rear of the first chamber, and disposed at one side of the second chamber so as to support the head of the passenger in case of a head-on collision of the vehicle; and a connection tether connecting the second and third chambers such that the second and third chambers are suppressed from separating from each other.

The third chamber may have a larger widthwise length than the second chamber.

The third chamber may be disposed at the same level as that of the second chamber.

A first passage part may be formed to connect the first and second chambers, a second passage part may be formed to connect the first and third chambers, and the second passage part may be formed in a larger size than the first passage part such that expansion of the third chamber is more quickly completed than expansion of the second chamber.

The connection tether may be disposed at the rear of the second chamber and the rear of the third chamber such that the head of a passenger comes in contact with the connection tether.

The connection tether may include a surface tether which covers the rear of the second chamber and the rear of the third chamber.

One side of the surface tether may be connected to the second chamber through a first sewed part, and the other side of the surface tether may be connected to the third chamber by a second sewed part. The first sewed part may be eccentrically positioned at the third chamber based on the center of the second chamber, and the second sewed part may be eccentrically positioned at the opposite side of the second chamber based on the center of the third chamber.

The connection tether may include one or more linear tethers for connecting the rear of the second chamber to the rear of the third chamber.

One side of the linear tether may be connected to the second chamber through a first sewed part, and the other side of the linear tether may be connected to the third chamber by a second sewed part. The first sewed part may be eccentrically positioned at the third chamber based on the center of the second chamber, and the second sewed part may be eccentrically positioned at the opposite side of the second chamber based on the center of the third chamber.

The connection tether may include: an upper connection tether connecting the top of the second chamber to the top of the third chamber; and a lower connection tether connecting the bottom of the second chamber to the bottom of the third chamber.

The upper connection tether may include one or more upper linear tethers for connecting the top of the second chamber to the top of the third chamber.

The lower connection tether may include one or more lower linear tethers for connecting the bottom of the second chamber to the bottom of the third chamber.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DESCRIPTION OF THE ILLUSTRATED EMBODIMENTS

Figure 1:
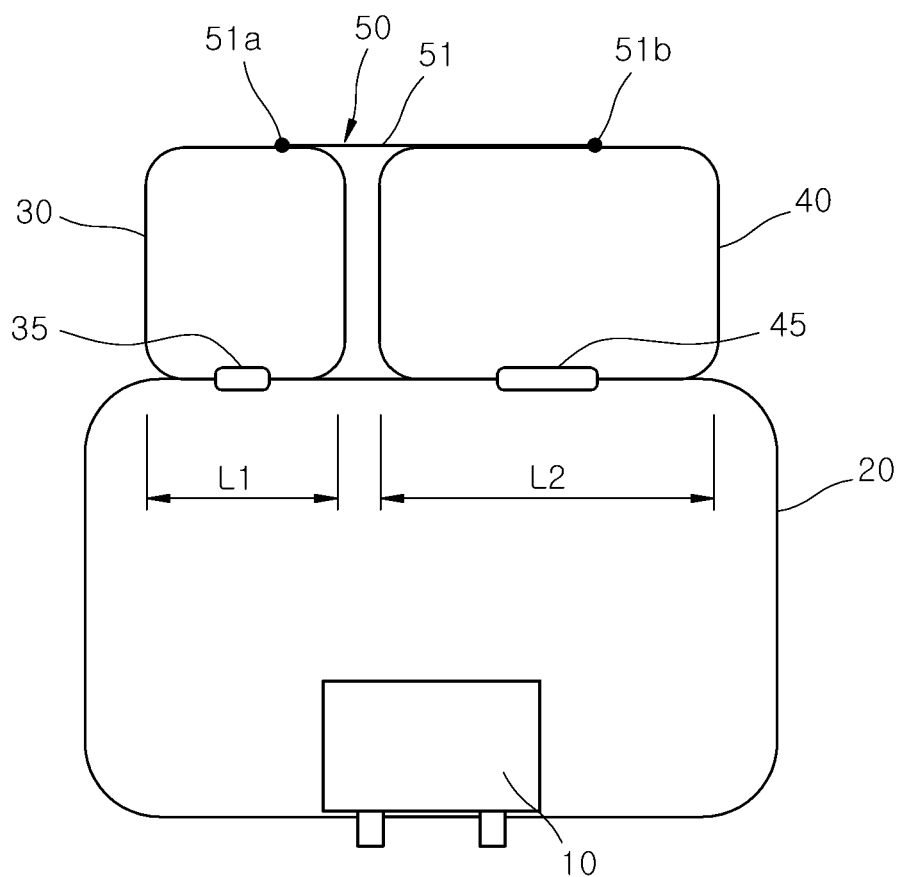
FIG. 1 is a plan view illustrating an airbag apparatus in accordance with a first embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements. It should be noted that the drawings are not to precise scale and may be exaggerated in the thickness of lines or sizes of components for descriptive convenience and clarity only. Furthermore, the terms as used herein are defined by taking functions of the invention into account and can be changed according to the custom or intention of the users or operators. Therefore, definition of the terms should be made according to the overall disclosures set forth herein.

It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Figure 2:
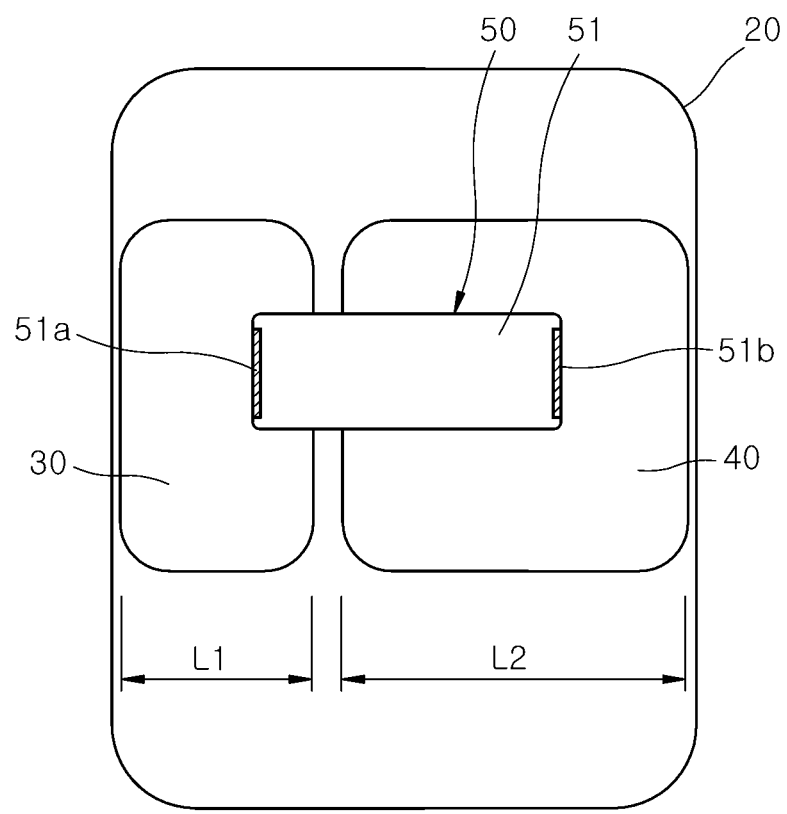
FIG. 2 is a rear view illustrating an example of a connection tether in the airbag apparatus in accordance with the first embodiment of the present invention.

FIG. 1 is a plan view illustrating an airbag apparatus in accordance with a first embodiment of the present invention, and FIG. 2 is a rear view illustrating an example of a connection tether in the airbag apparatus in accordance with the first embodiment of the present invention.

Referring to FIGS. 1 and 2, the airbag apparatus in accordance with the first embodiment of the present invention may include a first chamber 20, a second chamber 30, a third chamber 40 and a connection tether 50.

The first chamber 20 may be connected to an inflator 10. When the first chamber 20 is completely expanded, the first chamber 20 may have a rectangular box shape. The first chamber 20 may be supported inside the vehicle.

The second chamber 30 may be supported by the first chamber 20, and connected to the rear of the first chamber 20. That is, since the second chamber 30 is disposed closer to the rear of the vehicle than the first chamber 20, the head H of a passenger (refer to FIG. 4) may be supported by the second chamber 30 in case of an oblique collision of the vehicle. When the second chamber 30 is completely expanded, the second chamber 30 may have a rectangular box shape.

The third chamber 40 may be supported by the first chamber 20, and connected to the rear of the first chamber 20. The third chamber 40 may be disposed at one side of the second chamber 30, and support the head H of the passenger in case of a head-on collision of the vehicle. The third chamber 40 may be disposed in parallel to the second chamber 30 at the rear of the first chamber 20. When the third chamber 40 is completely expanded, the third chamber 40 may have a rectangular box shape.

The airbag apparatus in accordance with the first embodiment of the present invention may have a structure in which the first to third chambers 20 to 40 are divided, and deploy the first to third chambers 20 to 40 using one inflator 10. Therefore, the size of the airbag apparatus and the installation number of the inflator 10 can be reduced, which makes it possible to reduce the manufacturing cost of the vehicle.

The connection tether 50 may connect the second and third chambers 30 and 40 in order to suppress the second chamber 30 from separating from the third chamber 40. When the second and third chambers 30 and 40 are deployed, the connection tether 50 may limit a distance between the second and third chambers 30 and 40.

Therefore, in case of an oblique collision of the vehicle, the connection tether 50, the second chamber 30 and the first chamber 20 may be deformed in a stepwise manner while absorbing the load of the head H. At this time, while the head H is inserted between the second and third chambers 30 and 40, a motion of the head H may be limited. The holding force of the second and third chambers 30 and 40 may prevent a turn of the head H, which makes it possible to reduce a time required for holding the head H.

Since a turn of the head H is prevented in case of an oblique collision of the vehicle, an injury of the head H or the neck can be prevented. Furthermore, when the head H is moved obliquely in the direction of the oblique collision of the vehicle, the connection tether 50 may pull the second chamber 30 toward the third chamber 40 using a supporting force (reaction force) of the third chamber 40, which makes it possible to prevent the head H from being away from the second chamber 30. Therefore, although the sizes of the first to third chambers 20 to 40 are not increased, the head H can be sufficiently protected.

When the load of the head H is applied to the third chamber 40 in case of a head-on collision of the vehicle, the connection tether 50, the third chamber 40 and the first chamber 20 may absorb the shock of the head H in a stepwise manner. At this time, when the third chamber 40 is contracted forward by the load of the head H, reaction forces of the second and third chambers 30 and 40 may pull the connection tether 50 from both sides. Therefore, the load of the head H may be buffered by the tensile force of the connection tether 50, the reaction force of the second chamber 30 and the reaction force of the third chamber 40.

The widthwise length L2 of the third chamber 40 may be larger than the widthwise length L1 of the second chamber 30. At this time, the widthwise length L1 of the second chamber 30 may be set to a larger value than ½ of the widthwise length L2 of the third chamber 40. The widthwise lengths L1 and L2 of the second and third chambers 30 and 40 can be appropriately changed in consideration of the size of the vehicle and the widthwise length of the airbag apparatus.

Since the third chamber 40 is disposed at the front of the head H of the passenger, the head H may press the third chamber while being moved toward the front of the vehicle, in case of a head-on collision of the vehicle. Therefore, the head H may be prevented from being stuck between the second and third chambers 30 and 40 in case of a head-on collision of the vehicle.

The third chamber 40 may be formed at the same level as the second chamber 30. Since the second and third chambers 30 and 40 are formed at the same level, the reaction forces of the second and third chambers 30 and 40 may act to pull the connection tether 50 from both sides, even though the head H presses any one of the second and third chambers 30 and 40. Therefore, the load of the head H may be primarily absorbed by the tensile force of the connection tether 50, secondarily absorbed by the second chamber 30 and/or the third chamber 40, and finally absorbed by the first chamber 20.

The airbag apparatus may include a first passage part 35 for connecting the first and second chambers 20 and 30 and a second passage part 45 for connecting the first and third chambers 20 and 40. The first passage part 35 may be formed in a larger size than the second passage part 45 such that the third chamber 40 is expanded by gas supplied from the inflator 10 before the second chamber 30. At this time, although the second and third chambers 30 and 40 start to expand almost at the same time, the expansion of the third chamber 40 is more quickly completed than the expansion of the second chamber 30.

After the third chamber 40 is first expanded to support one side of the connection tether 50, the second chamber 30 may be expanded, which makes it possible to prevent the connection tether 50 from moving toward the second chamber 30 and then moving toward the third chamber 40, in case of an oblique collision or head-on collision of the vehicle. That is, the position of the connection tether 50 can be prevented from being changed in the widthwise direction of the vehicle, in case of an oblique or head-on collision of the vehicle. Therefore, since a turn of the head H by a motion of the connection tether 50 in the widthwise direction of the vehicle can be prevented, an injury of the head H or neck can be prevented.

The connection tether 50 may be disposed at the rear of the second chamber 30 and at the rear of the third chamber 40 such that the head H comes in contact with the connection tether 50. Therefore, when the head H collides with the second or third chamber 30 or 40, the connection tether 50 can primarily buffer the load of the head H.

The connection tether 50 may include a surface tether 51 which covers a part of the rear surface of the second chamber 30 and a part of the rear surface of the third chamber 40. The surface tether 51 may have a width ranging from ⅓ to ⅔ of the height of the second or third chamber 30 or 40. The surface tether 51 may indicate a rectangular or elliptical tether of which the width is smaller than the length. When the connection tether 50 is the surface tether 51, the surface tether 51 may come in uniform contact with a colliding part of the head H, which makes it possible to prevent a concentration of pressure on a specific part of the head H. Therefore, an injury of the head H by the connection tether 50 can be prevented.

One side (left side based on FIG. 5) of the surface tether 51 may be connected to the second chamber 30 by a first sewed part 51a, and the other side (right side based on FIG. 5) of the surface tether 51 may be connected to the third chamber 40 by a second sewed part 51b. The first sewed part 51a may be eccentrically positioned at the third chamber 40 based on the center of the second chamber 30, and the second sewed part 51b may be eccentrically positioned at the opposite side of the second chamber 30 based on the center of the third chamber 40. Since the other side of the surface tether 51 is eccentrically positioned at the opposite side of the second chamber 30 based on the center of the third chamber 40, the supporting force of the third chamber 40 to support the surface tether 51 can be increased when the second or third chamber 30 or 40 is pressed by the head H.

Figure 3:
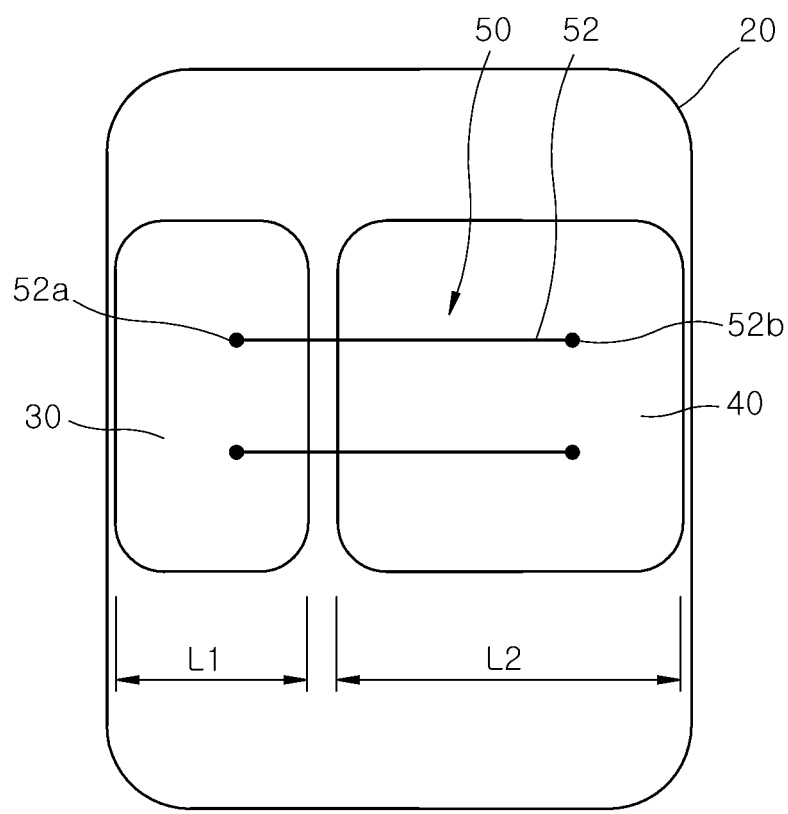
FIG. 3 is a rear view illustrating another example of the connection tether in the airbag apparatus in accordance with the first embodiment of the present invention.

FIG. 3 is a rear view illustrating another example of the connection tether in the airbag apparatus in accordance with the first embodiment of the present invention.

Referring to FIG. 3, the connection tether 50 may include one or more linear tethers 52 connecting the second and third chambers 30 and 40. The linear tether 52 may indicate a string-type or band-type tether formed in an elongated shape. The number of linear tethers 52 may be appropriately designed depending on the height of the second and third chambers 30 and 40 or the size of the vehicle.

One side of the linear tether 52 may be connected to the second chamber 30 by a first sewed part 52a, and the other side of the linear tether 52 may be connected to the third chamber 40 by a second sewed part 52b. The first sewed part 52a of the linear tether 52 may be eccentrically positioned at the third chamber 40 based on the center of the second chamber 30, and the second sewed part 51b of the linear tether 52 may be eccentrically positioned at the opposite side of the second chamber 30 based on the center of the third chamber 40. Since the other side of the linear tether 52 is eccentrically positioned at the opposite side of the second chamber 30 based on the center of the third chamber 40, the supporting force of the third chamber 40 to support the linear tether 52 can be increased when the second or third chamber 30 or 40 is pressed by the head H.

The operation of the airbag apparatus in accordance with the first embodiment of the present invention will be described. Hereafter, the operations of the airbag apparatus in case of an oblique collision and head-on collision of the vehicle will be sequentially described.

First, the operation of the airbag apparatus in case of an oblique collision of the vehicle will be described.

Figure 4:
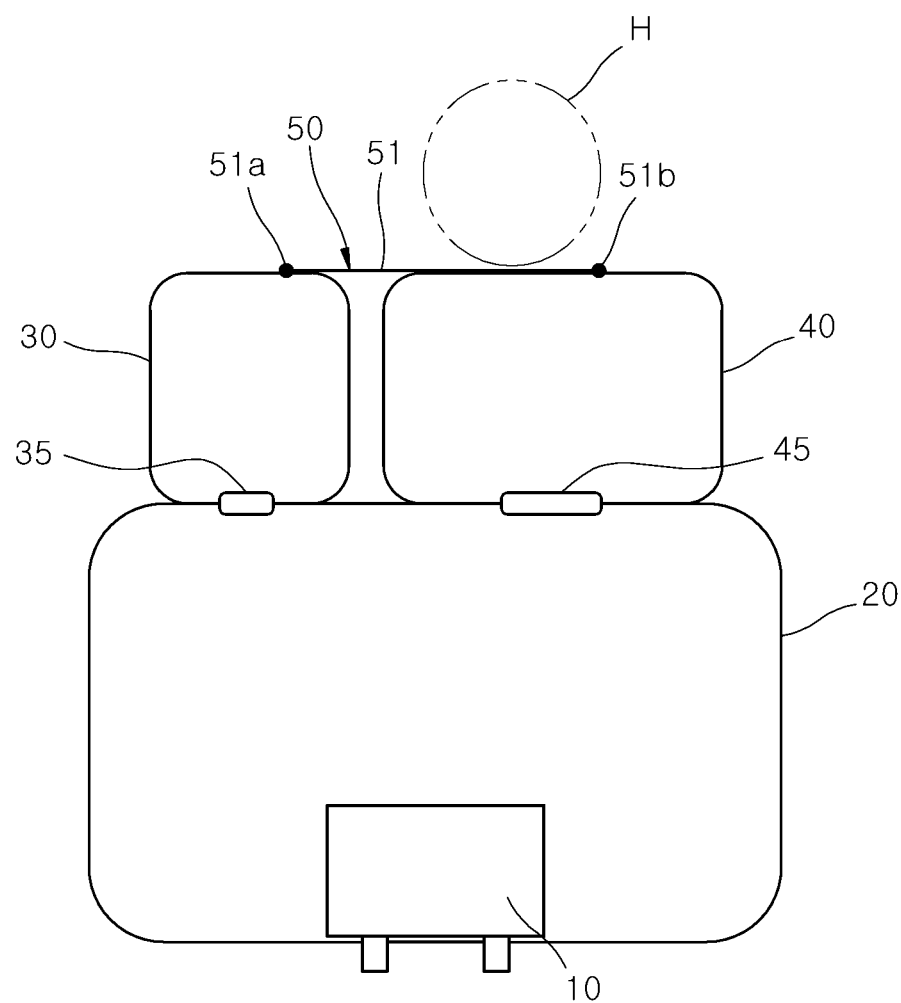
FIG. 4 is a plan view illustrating the position of a head in the airbag apparatus in accordance with the first embodiment of the present invention, before a collision of a vehicle.
Figure 5:
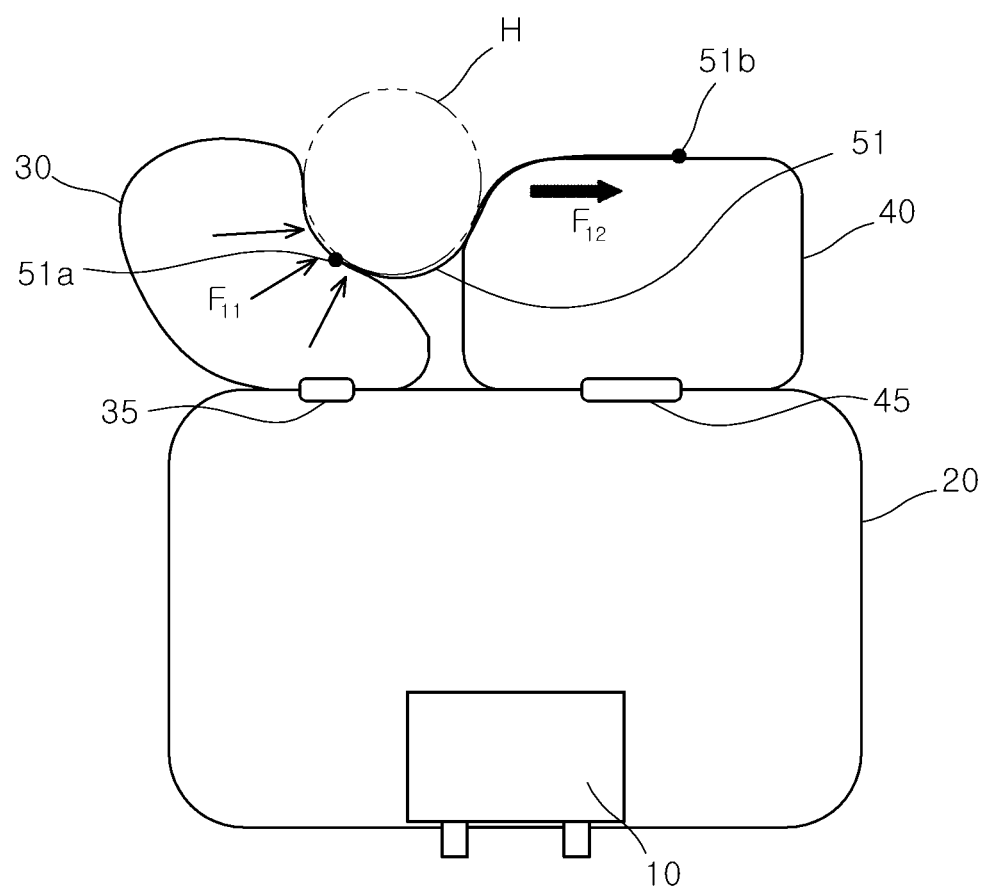
FIG. 5 is a plan view illustrating that the head is buffered by the connection tether and a second chamber in the airbag apparatus in accordance with the first embodiment of the present invention, in case of an oblique collision of the vehicle.

FIG. 4 is a plan view illustrating the position of a head in the airbag apparatus in accordance with the first embodiment of the present invention, before a collision of the vehicle, and FIG. 5 is a plan view illustrating that the head is buffered by the connection tether and the second chamber in the airbag apparatus in accordance with the first embodiment of the present invention, in case of an oblique collision of the vehicle.

Referring to FIGS. 4 and 5, gas generated from the inflator 10 may be injected to the first chamber 20 in case of an oblique collision of the vehicle, and the first chamber 20 may be deployed while being expanded toward the rear of the vehicle. The gas of the first chamber 20 may be introduced to the second chamber 30 through the first passage part 35, and introduced to the third chamber 40 through the second passage part 45. After the first chamber 20 is expanded, the third chamber 40 and the second chamber 30 may be sequentially and completely expanded.

In case of the oblique collision of the vehicle, the head H of a passenger may be obliquely moved toward the front of the vehicle. As the head H is obliquely moved toward the front, the head H may be inserted between the second and third chambers 30 and 40 and thus restricted from moving. Therefore, the second and third chambers 30 and 40 may be pressed against the head H and prevent a turn of the head H, which makes it possible to reduce a time required for holding the head H. Since the turn of the head H is prevented in case of an oblique collision of the vehicle, an injury of the head H or neck can be prevented. Furthermore, when the head H is moved obliquely in the direction of the oblique collision of the vehicle, the connection tether 60 may pull the second chamber 30 toward the third chamber 40 using a supporting force $F_{12}$ of the third chamber 40, which makes it possible to prevent the head H from being away from the second chamber 30.

In case of an oblique collision of the vehicle, the load of the head H may be first absorbed by a tensile force of the connection tether 50, and then absorbed by a buffering force $F_{11}$ of the second chamber 30. At this time, the connection tether 50 may primarily absorb the load of the head H using a pulling force of the third chamber 40, and the second chamber 30 may secondarily absorb the shock of the head H while being deformed by the load of the head H. The load of the head H, transferred to the second chamber 30, may be transferred to the first chamber 20 and thus tertiarily absorbed.

Next, the operation of the airbag apparatus in case of a head-on collision of the vehicle will be described.

Figure 6:
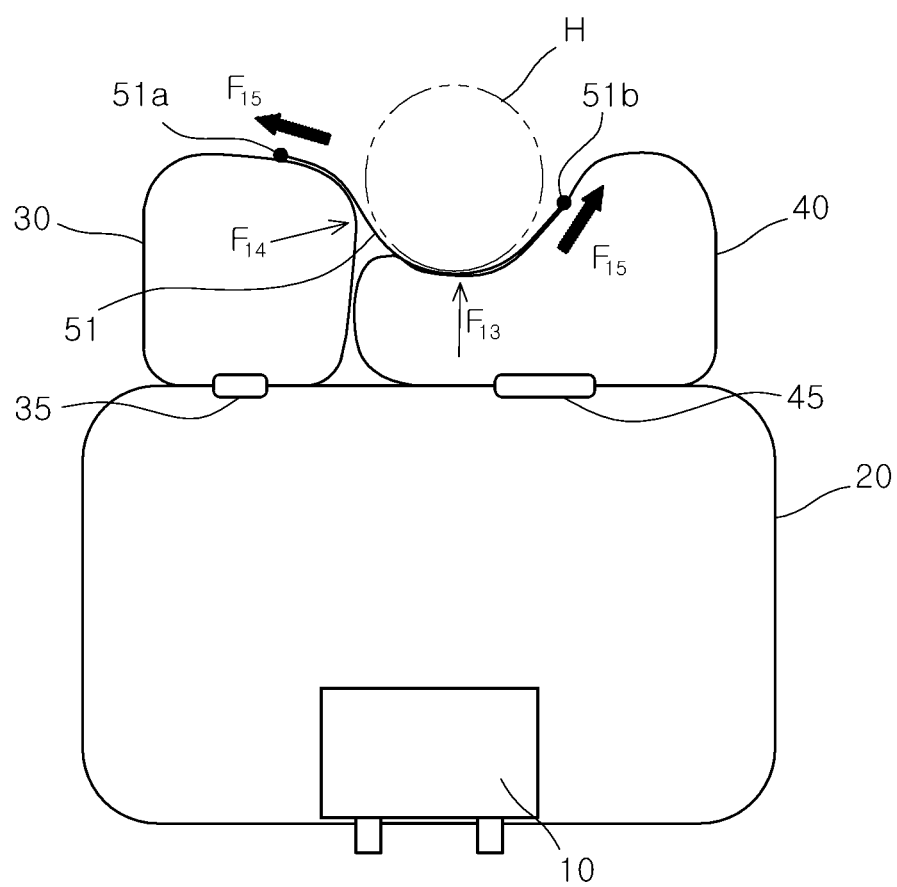
FIG. 6 is a plan view illustrating that the head is buffered by the connection tether and a third chamber in the airbag apparatus in accordance with the first embodiment of the present invention, in case of a head-on collision of the vehicle.

FIG. 6 is a plan view illustrating that a head is buffered by the connection tether and the third chamber in the airbag apparatus in accordance with the first embodiment of the present invention, in case of a head-on collision of the vehicle.

Referring to FIG. 6, the third chamber 40 may be disposed at the front of the head H because the widthwise length L2 of the third chamber 40 is larger than the widthwise length L1 of the second chamber 30. Therefore, the head H may be moved to the third chamber 40 in case of a head-on collision of the vehicle.

As the third chamber 40 is deformed by the load of the head H, both sides of the connection tether 50 may be pulled by the second and third chambers 30 and 40. Therefore, the load of the head H may be primarily absorbed by tensile forces $F_{14}$ and $F_{15}$ of the connection tether 50, and secondarily absorbed by a buffering force $F_{13}$ of the third chamber 40. The pressure applied to the third chamber 40 may be transferred to the first chamber 20 and thus tertiarily absorbed.

Next, an airbag apparatus in accordance with a second embodiment of the present invention will be described. The second embodiment is different from the first embodiment in terms of connection positions between a connection tether 60 and the second and third chambers 30 and 40. Thus, the descriptions of the same components as those of the first embodiment are omitted herein.

Figure 7:
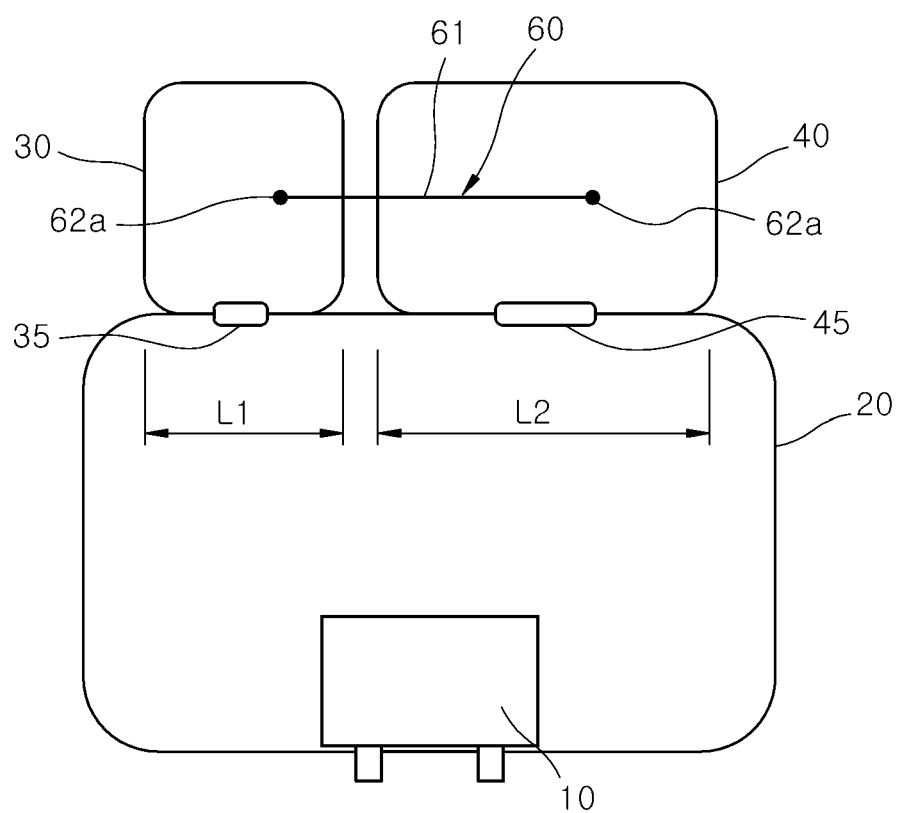
FIG. 7 is a plan view illustrating an airbag apparatus in accordance with a second embodiment of the present invention.

FIG. 7 is a plan view illustrating the airbag apparatus in accordance with the second embodiment of the present invention, and FIG. 2 is a rear view illustrating the airbag apparatus in accordance with the second embodiment of the present invention.

Figure 8:
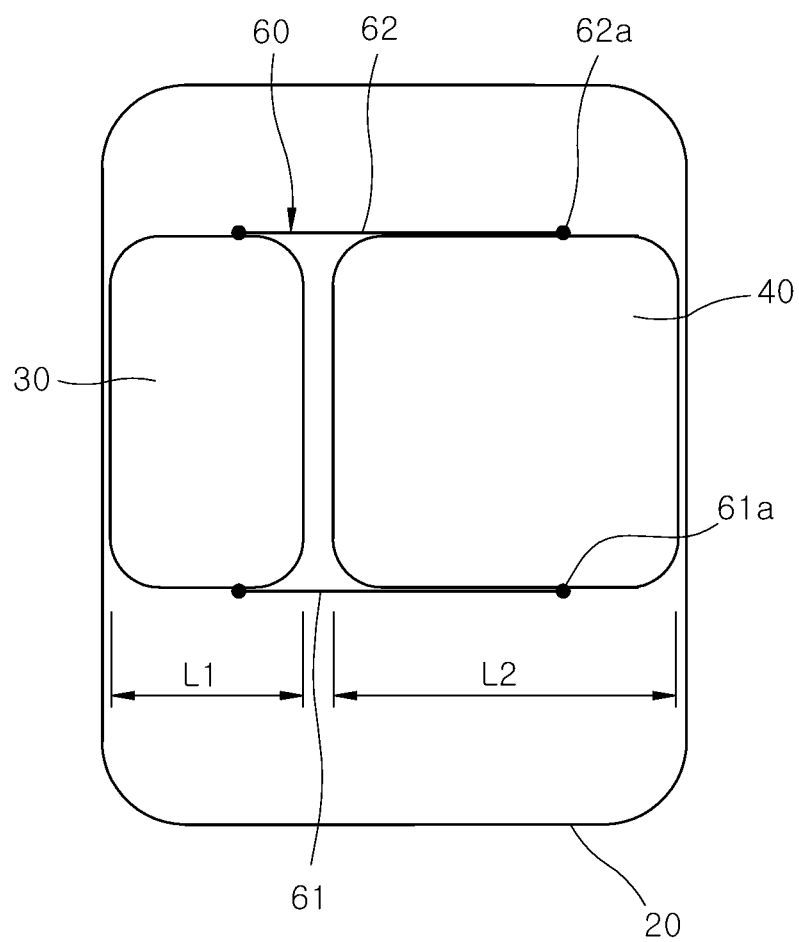
FIG. 8 is a rear view illustrating the airbag apparatus in accordance with the second embodiment of the present invention.

Referring to FIGS. 7 and 8, the connection tether 60 may include a lower connection tether 61 and an upper connection tether 62. Both sides of the lower connection tether 61 may be connected to the bottom of the second chamber 30 and the bottom of the third chamber 40 through lower sewed parts 61a, respectively. Furthermore, both sides of the upper connection tether 62 may be connected to the top of the second chamber 30 and the top of the third chamber 40 through upper sewed parts 61a, respectively.

The lower connection tether 61 may connect the bottom of the second chamber 30 to the bottom of the third chamber 40. The upper connection tether 62 may connect the top of the second chamber 30 to the top of the third chamber 40. Since the lower and upper connection tethers 61 and 62 connect the second and third chambers 30 and 40 at the bottoms and tops, the lower and upper connection tethers 61 and 62 can suppress the second chamber 30 from separating from the third chamber 40.

Therefore, since the head H is inserted and held between the third and third chambers 30 and 40 in case of an oblique collision of the vehicle, a turn of the head H can be prevented by the holding force of the second and third chambers 30 and 40, and a time required for holding the head H can be shortened. Since a turn of the head H is prevented in case of an oblique collision of the vehicle, an injury of the head H or neck can be prevented. Furthermore, although the head H is obliquely moved in the direction of the oblique collision of the head H, the buffering force of the second chamber 30 and the reaction force of the third chamber 40 to pull the connection tether 60 can prevent the head H from being away from the second chamber 30.

When the load of the head H is applied to the third chamber 40 in case of a head-on collision of the vehicle, the third chamber 40 and the first chamber 20 may absorb the shock of the head H in a stepwise manner. At this time, since the lower and upper connection tethers 61 and 62 are disposed at the tops and bottoms of the second and third chambers 30 and 40, the head H may not come in contact with the lower and upper connection tethers 61 and 62 in case of the collision of the vehicle.

The lower connection tether 61 may include one or more lower linear tethers connecting the bottoms of the second and third chambers 30 and 40. Both sides of the lower connection tether 61 may be connected to the second chamber 30 and the third chamber 40 through lower sewed parts 61a, respectively. The lower linear tether may indicate a string-type or band-type tether formed in an elongated shape. The number of lower linear tethers may be appropriately designed depending on the height of the second and third chambers 30 and 40 or the size of the vehicle.

The upper connection tether 62 may include one or more upper linear tethers connecting the tops of the second and third chambers 30 and 40. Both sides of the upper connection tether 62 may be connected to the second chamber 30 and the third chamber 40 through upper sewed parts 62a. The upper linear tether may indicate a string-type or band-type tether formed in an elongated shape. The number of upper linear tethers may be appropriately designed depending on the height of the second and third chambers 30 and 40 or the size of the vehicle.

The lower connection tether 61 may include a lower surface tether covering the bottom of the second chamber 30 and the bottom of the third chamber 40. Furthermore, the lower connection tether 61 may include a lower surface tether covering the bottom of the second chamber 30 and the bottom of the third chamber 40. The surface tether may have a width ranging from ⅓ to ⅔ of the thickness of the second or third chamber 30 or 40 in the front to rear direction. The surface tether may indicate a rectangular or elliptical shape tether of which the width is smaller than the length.

The operation of the airbag apparatus in accordance with the second embodiment of the present invention will be described. Hereafter, the operations of the airbag apparatus in case of an oblique collision and head-on collision of the vehicle will be sequentially described.

First, the operation of the airbag apparatus in case of an oblique collision of the vehicle will be described.

Figure 9:
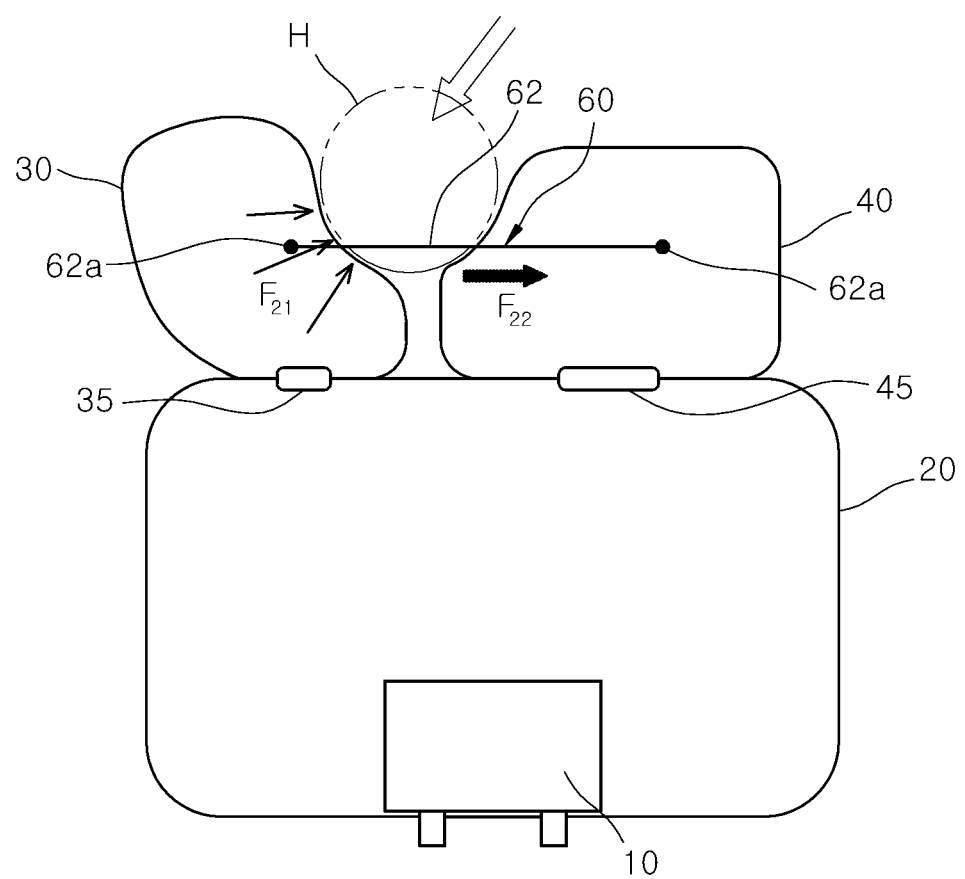
FIG. 9 is a plan view illustrating that a head is buffered by a connection tether and a second chamber in the airbag apparatus in accordance with the second embodiment of the present invention, in case of an oblique collision of the vehicle.

FIG. 9 is a plan view illustrating that a head is buffered by the connection tether and the second chamber in the airbag apparatus in accordance with the second embodiment of the present invention, in case of an oblique collision of the vehicle.

Referring to FIG. 9, gas generated from the inflator 10 may be injected to the first chamber 20 in case of an oblique collision of the vehicle. The first chamber 20 may be deployed while being expanded toward the rear of the vehicle. The gas of the first chamber 20 may be introduced to the second chamber 30 through the first passage part 35, and introduced to the third chamber 40 through the second passage part 45. After the first chamber 20 is expanded, the third chamber 40 and the second chamber 30 may be sequentially and completely expanded.

In case of an oblique collision of the vehicle, the head H of a passenger may be obliquely moved toward the front of the vehicle. As the head H is obliquely moved toward the front, the head H may be inserted and held between the second and third chambers 30 and 40. Therefore, the second and third chambers 30 and 40 may be pressed against the head H and prevent a turn of the head H, which makes it possible to reduce a time required for holding the head H. Since a turn of the head H is prevented in case of an oblique collision of the vehicle, an injury of the head H or neck can be prevented. Furthermore, when the head H is obliquely moved in the direction of the oblique collision of the head H, a buffering force $F_{21}$ of the second chamber 30 and a force $F_{22}$ to pull the connection tether 60 toward the third chamber 40 can prevent the head H from being away from the second chamber 30.

Next, the operation of the airbag apparatus in case of a head-on collision of the vehicle will be described.

Figure 10:
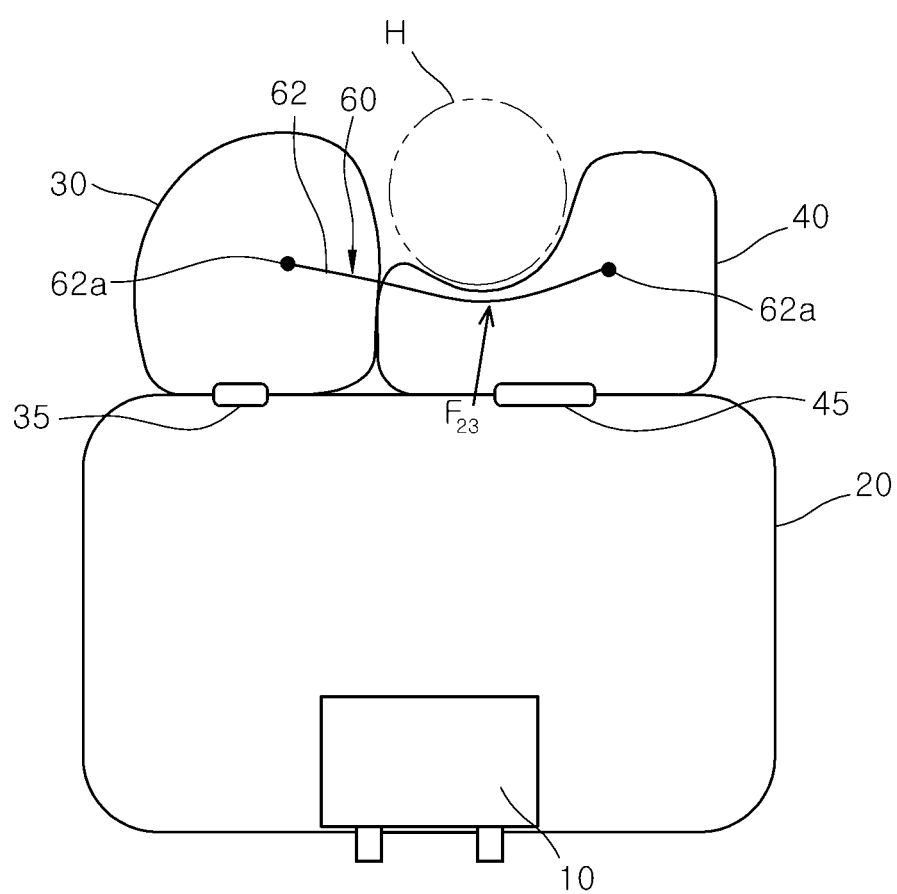
FIG. 10 is a plan view illustrating that the head is buffered by the connection tether and a third chamber in the airbag apparatus in accordance with the second embodiment of the present invention, in case of a head-on collision of the vehicle.

FIG. 10 is a plan view illustrating that the head is buffered by the connection tether and the third chamber in the airbag apparatus in accordance with the second embodiment of the present invention, in case of a head-on collision of the vehicle.

Referring to FIG. 10, the third chamber 40 may be disposed at the front of the head H because the widthwise length L2 of the third chamber 40 is larger than the widthwise length L1 of the second chamber 30. Therefore, the head H may be moved to the third chamber 40 in case of a head-on collision of the vehicle.

The third chamber 40 may be pressed and deformed by the head H. The load of the head H may be primarily absorbed by a buffering force $F_{23}$ of the third chamber 40, and the pressure applied to the third chamber 40 may be transferred to the first chamber 20 and secondarily absorbed.

In accordance with the embodiments of the present invention, since the head is inserted and held between the second and third chambers in case of an oblique collision of the vehicle, a turn of the had can be prevented by the holding force of the second and third chambers, and the time required for holding the head can be reduced. Therefore, the airbag apparatus can prevent an injury of the head or neck.

Furthermore, when the head is obliquely moved in the direction of the oblique collision of the vehicle, the connection tether may pull the second chamber toward the third chamber using the supporting force of the third chamber, thereby preventing the head from being away from the second chamber.

Furthermore, in case of a head-on collision, the load of the head can be absorbed while being transferred to the connection tether, the third chamber and the first chamber.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An airbag apparatus comprising:
   a first chamber connected to an inflator;
   a second chamber supported by the first chamber and connected to a rear of the first chamber so as to support the head of a passenger in case of an oblique collision of a vehicle;
   a third chamber supported by the first chamber, connected to a rear of the first chamber, and disposed at one side of the second chamber so as to support the head of the passenger in case of a head-on collision of the vehicle; and
   a connection tether connecting the second and third chambers to each other, the connection tether being configured to prevent the second and third chambers from separating from each other,
   wherein:
   the second chamber is disposed on only one side of the third chamber; and
   the third chamber overlaps a center portion of the first chamber and has a greater widthwise length than that of the second chamber.

2. The airbag apparatus of claim 1, wherein the third chamber is disposed at the same level as that of the second chamber.

3. The airbag apparatus of claim 1, further comprising:
   a first passage part configured to connect the first and second chambers; and
   a second passage part configured to connect the first and third chambers,
   wherein the second passage part is larger than the first passage part such that expansion of the third chamber is more quickly completed than expansion of the second chamber.

4. The airbag apparatus of claim 1, wherein the connection tether is disposed at the rear of the second chamber and the rear of the third chamber such that the head of the passenger comes into contact with the connection tether.

5. The airbag apparatus of claim 4, wherein the connection tether comprises a surface tether which covers the rear of the second chamber and the rear of the third chamber.

6. The airbag apparatus of claim 5, wherein:
   one side of the surface tether is connected to the second chamber through a first sewed part, and the other side of the surface tether is connected to the third chamber by a second sewed part; and the first sewed part is eccentrically positioned at the third chamber based on the center of the second chamber; and the second sewed part is eccentrically positioned at the opposite side of the second chamber based on the center of the third chamber.

7. The airbag apparatus of claim 4, wherein the connection tether comprises a linear tether for connecting the rear of the second chamber to the rear of the third chamber.

8. The airbag apparatus of claim 7, wherein:
one side of the linear tether is connected to the second chamber through a first sewed part, and the other side of the linear tether is connected to the third chamber by a second sewed part; and the first sewed part is eccentrically positioned at the third chamber based on the center of the second chamber, and the second sewed part is eccentrically positioned at the opposite side of the second chamber based on the center of the third chamber.

9. The airbag apparatus of claim 1, wherein the connection tether comprises:
an upper connection tether connecting a top of the second chamber to a top of the third chamber; and
a lower connection tether connecting a bottom of the second chamber to a bottom of the third chamber.

10. The airbag apparatus of claim 9, wherein the upper connection tether comprises an upper linear tether for connecting the top of the second chamber to the top of the third chamber.

11. The airbag apparatus of claim 9, wherein the lower connection tether comprises a lower linear tether for connecting the bottom of the second chamber to the bottom of the third chamber.

* * * * *